(12) United States Patent
Karnjate et al.

(10) Patent No.: US 7,890,240 B2
(45) Date of Patent: Feb. 15, 2011

(54) BRAKE SYSTEM FAULT PEDAL GAIN CHANGE METHOD AND SYSTEM

(75) Inventors: Timothy M. Karnjate, Grand Blanc, MI (US); William K. Manosh, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 964 days.

(21) Appl. No.: 11/740,536

(22) Filed: Apr. 26, 2007

(65) Prior Publication Data
US 2008/0265662 A1    Oct. 30, 2008

(51) Int. Cl.
G06G 7/00    (2006.01)
G06G 7/76    (2006.01)

(52) U.S. Cl. .............. 701/70; 701/83; 701/88; 303/3; 303/15; 73/132; 188/106 F; 188/158

(58) Field of Classification Search .......... 701/70, 701/78–79, 48, 83, 88; 73/121, 132; 303/155, 303/158, 112.12, 3, 15; 188/156, 1.11 E, 188/1.11 R, 106 F, 158
See application file for complete search history.

(56) References Cited

U.S. PATENT DOCUMENTS

| | | | | |
|---|---|---|---|---|
| 3,979,950 | A * | 9/1976 | Maxwell | 73/126 |
| 4,658,939 | A * | 4/1987 | Kircher et al. | 188/156 |
| 5,626,362 | A * | 5/1997 | Mottola | 280/767 |
| 6,050,649 | A * | 4/2000 | Hensley | 303/7 |
| 6,167,354 | A * | 12/2000 | Maleki et al. | 702/147 |
| 6,182,001 | B1 * | 1/2001 | Sugai et al. | 701/78 |
| 6,183,050 | B1 * | 2/2001 | Ganzel | 303/114.1 |
| 6,212,460 | B1 * | 4/2001 | Rizzo et al. | 701/70 |
| 6,226,586 | B1 * | 5/2001 | Luckevich et al. | 701/70 |
| 6,474,753 | B1 * | 11/2002 | Rieth et al. | 303/191 |
| 6,898,496 | B2 * | 5/2005 | Chernoff et al. | 701/41 |
| 6,923,510 | B2 * | 8/2005 | Hac | 303/122 |
| 7,031,819 | B2 * | 4/2006 | Hack et al. | 701/82 |
| 7,204,564 | B2 * | 4/2007 | Brown et al. | 303/7 |

(Continued)

FOREIGN PATENT DOCUMENTS

DE    19807368 A1    8/1999

(Continued)

OTHER PUBLICATIONS

Application of Genetic Algorithm for Braking Force Distribution of Electric Vehicles; Jingang Guo et al.; Industrial Electronics and Applications, 2009. ICIEA 2009. 4th IEEE Conference on; Digital Object Identifier: 10.1109/ICIEA.2009.5138577; Publication Year: 2009, pp. 2150-2154.*

(Continued)

*Primary Examiner*—Cuong H Nguyen
(74) *Attorney, Agent, or Firm*—Quinn Law Group, PLLC

(57) ABSTRACT

A brake system fault pedal gain change method and system for brake pedal simulator equipped vehicles such as hybrid electric vehicles is provided. In the event of a brake system booster fault, the method alerts the driver by way of tactile feedback. Additionally, the disclosed method provides a controlled means to gradually increase required brake pedal force during a brake system fault to avoid an abrupt change in brake pedal force when the brake system boost is depleted.

17 Claims, 4 Drawing Sheets

U.S. PATENT DOCUMENTS

| | | | | |
|---|---|---|---|---|
| 7,814,751 | B2* | 10/2010 | Ebert | 60/562 |
| 2003/0085612 | A1* | 5/2003 | Bond et al. | 303/9 |
| 2004/0133322 | A1* | 7/2004 | Chernoff et al. | 701/41 |
| 2007/0192010 | A1* | 8/2007 | Carlstrom et al. | 701/70 |
| 2008/0135357 | A1* | 6/2008 | Lang | 188/158 |
| 2008/0265662 | A1* | 10/2008 | Karnjate et al. | 303/3 |
| 2009/0113890 | A1* | 5/2009 | Ebert | 60/562 |
| 2010/0001577 | A1* | 1/2010 | Hatano | 303/3 |

FOREIGN PATENT DOCUMENTS

| | | | |
|---|---|---|---|
| DE | 102004040616 A1 | | 2/2006 |
| DE | 102008020363 A1 | * | 11/2008 |
| DE | 102009031392 A1 | * | 1/2010 |
| DE | 102009009647 A1 | * | 8/2010 |
| EP | 689042 A2 | * | 12/1995 |
| JP | 11157439 A | * | 6/1999 |
| JP | 2003242182 A | * | 8/2003 |
| JP | 2009227173 A | * | 10/2009 |
| WO | WO 2010094489 A2 | * | 8/2010 |

OTHER PUBLICATIONS

Diagnostic End to End Monitoring & Fault Detection for Braking Systems; Murphy, B.J. et al.; Aerospace Conference, 2006 IEEE; Digital Object Identifier: 10.1109/AERO.2006.1656130; Publication Year: 2006 , pp. 1-8.*

Investigation to Simulation of Regenerative Braking for Parallel Hydraulic Hybrid Vehicles; Tao Liu et al.; Measuring Technology and Mechatronics Automation, 2009. ICMTMA '09. International Conference on; vol. 2; Digital Object Identifier: 10.1109/ICMTMA.2009.418; Publication Year: 2009 , pp. 242-245.*

Study on Braking Force Distribution of Electric Vehicles; Jingang Guo et al.; Power and Energy Engineering Conference, 2009. APPEEC 2009. Asia-Pacific; Digital Object Identifier: 10.1109/APPEEC.2009.4918806; Publication Year: 2009 , pp. 1-4.*

Investigation of Sliding-Surface Design on the Performance of Sliding Mode Controller in Antilock Braking Systems; Taehyun Shim et al.; Vehicular Technology, IEEE Transactions on; vol. 57 , Issue: 2; Digital Object Identifier: 10.1109/TVT.2007.905391; Publication Year: 2008 , pp. 747-759.*

A novel brake control strategy for electric vehicles based on slip trial method; Zhou Lei et al.; Vehicular Electronics and Safety, 2007. ICVES. IEEE International Conference on; Digital Object Identifier: 10.1109/ICVES.2007.4456364; Publication Year: 2007 , pp. 1-6.*

Stabilization of Automotive Vehicles Using Active Steering and Adaptive Brake Control Allocation; Tjonnas, J. et al.; Control Systems Technology, IEEE Transactions on; vol. 18 , Issue: 3; Digital Object Identifier: 10.1109/TCST.2009.2023981 Publication Year: 2010 , pp. 545-558.*

Vehicle Stability Control Strategy Based on Active Torque Distribution and Differential Braking; Siqi Zhang et al.; Measuring Technology and Mechatronics Automation, 2009. ICMTMA '09. International Conference on; vol. 1; Digital Object Identifier: 10.1109/ICMTMA.2009.380; Publication Year: 2009 , pp. 922-925.*

Object oriented modeling and simulation of a pneumatic brake system with ABS; Hongchang Zhang et al.; Intelligent Vehicles Symposium, 2009 IEEE; Digital Object Identifier: 10.1109/IVS.2009.5164377; Publication Year: 2009 , pp. 780-785.*

Modelling Experimentation and Simulation of a Brake Apply System; Khan, Y. et al.; American Control Conference, 1992 Publication Year: 1992 , pp. 226-230.*

A control system for maintaining constant braking torque on a disk brake dynamometer; Hancke, G.P. et al.; Zietsman, R.E.; Industrial Electronics Society, 1989. IECON '89., 15th Annual Conference of IEEE; Digital Object Identifier: 10.1109/IECON.1989.69651; Publication Year: 1989 , pp. 307-312 vol. 2.*

Effective regenerative braking control for smooth stop of a hybrid electric bus; Jie Shu et al.; Vehicle Power and Propulsion Conference, 2008. VPPC '08. IEEE; Digital Object Identifier: 10.1109/VPPC.2008.4677695 Publication Year: 2008 , pp. 1-5.*

Driver Behavior Analysis During ACC Activation and Deactivation in a Real Traffic Environment; Pauwelussen, J.; Feenstra, P.J.; Intelligent Transportation Systems, IEEE Transactions on; vol. 11 , Issue: 2; Digital Object Identifier: 10.1109/TITS.2010.2043099; Publication Year: 2010 , pp. 329-338.*

Research on the EHB system control method base on identification of drivers' braking intentions; Shou-tao Li et al.; Asian Control Conference, 2009. ASCC 2009. 7th; Publication Year: 2009 , pp. 1439-1443.*

* cited by examiner

BRAKE SYSTEM FAULT PEDAL GAIN CHANGE METHOD AND SYSTEM

TECHNICAL FIELD

The present invention provides brake system fault pedal gain change method and system for brake pedal simulator equipped vehicles, providing feedback to a driver in the form of an increase in the amount of brake pedal actuation force required to achieve a given vehicle deceleration so as to warn the driver of a detected fault in the vehicle brake boost system.

BACKGROUND OF THE INVENTION

Brake systems are critical to the safe operation and control of a motor vehicle. In conventional vehicle brake systems, the vehicle driver depresses the brake pedal to decelerate the vehicle and the vehicle brake system responds with a reactive force back to the driver through the pedal that the driver may mentally relate to the amount of braking torque applied by the vehicle braking system. In a hydraulic boosted or assisted braking system, as the driver depresses the brake pedal the booster device generates a brake line pressure corresponding to a multiple (also known as boost ratio) of the driver applied pedal pressure. In this way, the driver's applied brake pedal force is multiplied to provide greater friction braking at the wheels of the vehicle. Similar to the earlier non-boosted brake system discussion, the boosted brake system typically responds with a reactive force through the brake pedal back to the driver by which the driver can gauge the driver's requested braking torque (or requested vehicle deceleration).

In a hybrid electric vehicle or pure electric vehicle the brake systems are more complicated than the brake systems described above. Hybrid electric vehicles are characterized in that they utilize one or more electric motors or motor/generators to convert stored electrical energy from a battery into the kinetic energy of the moving vehicle. In such vehicles, stored electrical energy in the battery is a limited and precious resource. Therefore, hybrid electric vehicles typically employ one or more generators or motor/generator devices adapted to provide a braking torque by converting or regenerating a portion of the kinetic energy of a moving vehicle into electrical energy stored back to the vehicle's batteries. Such braking is known as regenerative braking and is preferred to the fullest extent possible over friction braking as the kinetic energy is recovered rather than being dissipated as heat through friction brakes.

In mechanical brake systems such as the non-hybrid brake systems discussed above, a failure or degradation in the operation of the brake system due to a fault such as a booster pump fault is immediately noticeable by the driver as the brake system typically requires more brake pedal force from the driver to stop the vehicle.

SUMMARY OF THE INVENTION

The present invention provides a brake system fault pedal gain change method for brake pedal simulator equipped vehicles, providing feedback to a driver in the form of an increase in the amount of brake pedal actuation force required to achieve a given vehicle deceleration so as to warn the driver of a detected fault in the vehicle brake boost system.

In hybrid electric vehicles, as the driver depresses the brake pedal, the driver applied braking pedal force and/or pedal travel is detected by one or more sensors and converted to a requested braking torque by a braking control system on the vehicle. In the case of a hybrid electric vehicle, the braking torque can be applied as a selected combination of friction braking torque and available electric regeneration torque capability of the vehicle's electric drive system. As operation of electric and hybrid vehicles requires the depletion of stored electrical energy in the vehicle's batteries to accelerate and drive the vehicle, it is highly desirable to utilize regenerative braking to the greatest extent possible to recover and recycle kinetic energy and to apply friction braking to backfill limitations in available regenerative braking. The available regenerative braking torque at any moment depends on several factors including vehicle speed, battery state of charge and a variety of other factors. At any time when braking the vehicle, the amount of friction brake torque may need to be increased or decreased dynamically to fulfill the driver's requested braking torque as commanded and sensed through the vehicle's brake pedal. Therefore, the direct relationship between driver applied brake pedal force and the resultant applied friction braking torque that is present in vehicles with only friction braking no longer exists in hybrid and electric vehicles which utilize regenerative braking in addition to friction braking which must dynamically distribute requested braking torque among these braking devices.

Hybrid and electric vehicles can be provided with a brake pedal simulator or emulator which allows the driver to be mechanically isolated from a vehicle's base brake system such that the driver pressing on the brake pedal does not result in any direct mechanical deceleration of the vehicle under normal operating conditions. Brake simulators are generally used in conjunction with an electronic braking system and are adapted to sense driver applied braking force and/or brake pedal travel to arrive at a driver requested braking torque. Electronic braking systems can be used on hybrid vehicles where modifications in friction brake torque relative to regenerative braking torque are made during a stop and must remain transparent to the driver. Such electronic braking systems can utilize a driver braking intent algorithm to convert electronic sensor readings in the braking simulator into a driver intended brake torque that is then processed by the brake simulator into a regenerative braking torque command and a friction braking torque command to be transmitted to other systems in the vehicle.

Friction brake assemblies on each wheel of the vehicle can be referred to as brake corners which generally include the subassembly of brake calipers, rotors, actuators, etc. at the vehicle wheels. A brake system utilizing hydraulic brake corners generally includes a brake fluid pressure generating device and a pressure storage device such as an accumulator. These devices are used to supply pressure to the brake corners in order to decelerate the vehicle. It is possible for the pressure generating device or pump to fault or fail to activate during vehicle operation. This fault may be detected through software in the braking system or other systems and an appropriate action may be taken. This current invention provides a solution in the form of a brake system response to a detected brake system fault that may be taken when the fault is detected to alert the driver to a condition that could lead to an unboosted brake condition over time.

If a brake pump fault occurs, it is possible for the fault to clear and for the brake system to resume normal operation. If a pump fault does not clear, the vehicle can be driven and the brake system may operate normally until the pressure storage device is depleted at which time the system will default to an unboosted state. The transition from a boosted to unboosted state can be abrupt and undesirable to the driver as it may result in a large increase in the pedal force required to produce a given vehicle deceleration.

Vehicles often include fault warning devices to electronically warn a driver of a vehicle fault such as a driver information center which displays error conditions as text messages on a display screen and also through fault indicator lamps included within the driver's viewing area of the instrument panel. Where driver information centers (DIC) are provided, the DIC is often displaying a variety of messages such as (for example) "Headlights must be on" or "Washer fluid low" and so the driver may ignore the brake system fault message when a brake system fault occurs. Therefore, it is desirable to give the driver some tactile feedback that a fault has occurred prior to the brake system reverting to an unboosted state.

The present invention provides a means and method to alert the vehicle driver through increases in required brake pedal force and/or travel in the event of a fault such as a pump motor fault in order to provide additional feedback to the driver that a fault has indeed occurred. Should the brake system pressure storage device become depleted, the vehicle will default to an unboosted brake system state. The pedal force will again increase in the unboosted state and appropriate instrument panel indicators or driver information center messages will be lit at such time.

According to one aspect of the present invention, the gradual brake system degradation apparent to the driver alerts the driver to a serious brake system fault by providing tactile feedback to the driver in the form of an increase in brake pedal force required to decelerate or stop the vehicle. The present invention brings about a gradual decrease in braking system performance over time rather than the abrupt drop in brake system performance that would occur when the brake boost system is no longer able to assist the driver in stopping the vehicle as would occur without the present invention. This gradual decrease in brake performance mimics the response to a fault in mechanical brake systems which a driver can logically associate with a vehicle brake system problem.

According to the present invention, in the event of a brake system fault such as a pump motor fault, a multiplier (also known as a reduction calibration) is applied to the driver requested brake torque which will reduce the total requested driver braking torque (as sensed from the applied brake pedal force and/or travel) by a calibrated percentage. It is important that the calibrated percentage reduction allow the vehicle to continue to meet FMVSS-135 guidelines during the fault. The driver is alerted to the detected fault by the resultant effect that a slightly higher pedal force is then required to achieve a given deceleration.

It is possible that the brake system fault, such as a pump motor fault, can clear itself. According to the present invention, when the brake fault clears the driver requested brake torque will return to normal, essentially returning the brake system to a normal boosted brake gain, but only when the driver is not depressing the brake pedal so that there is never an increase in pedal gain (and resulting braking torque) during a stop.

The present invention provides a means to alert the driver to a pending loss of boosted brake operation while permitting the driver to adjust to a gradually degrading brake system performance. It may work in conjunction with other vehicle warning light or driver message strategies or stand alone as the sole method of alerting the driver.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
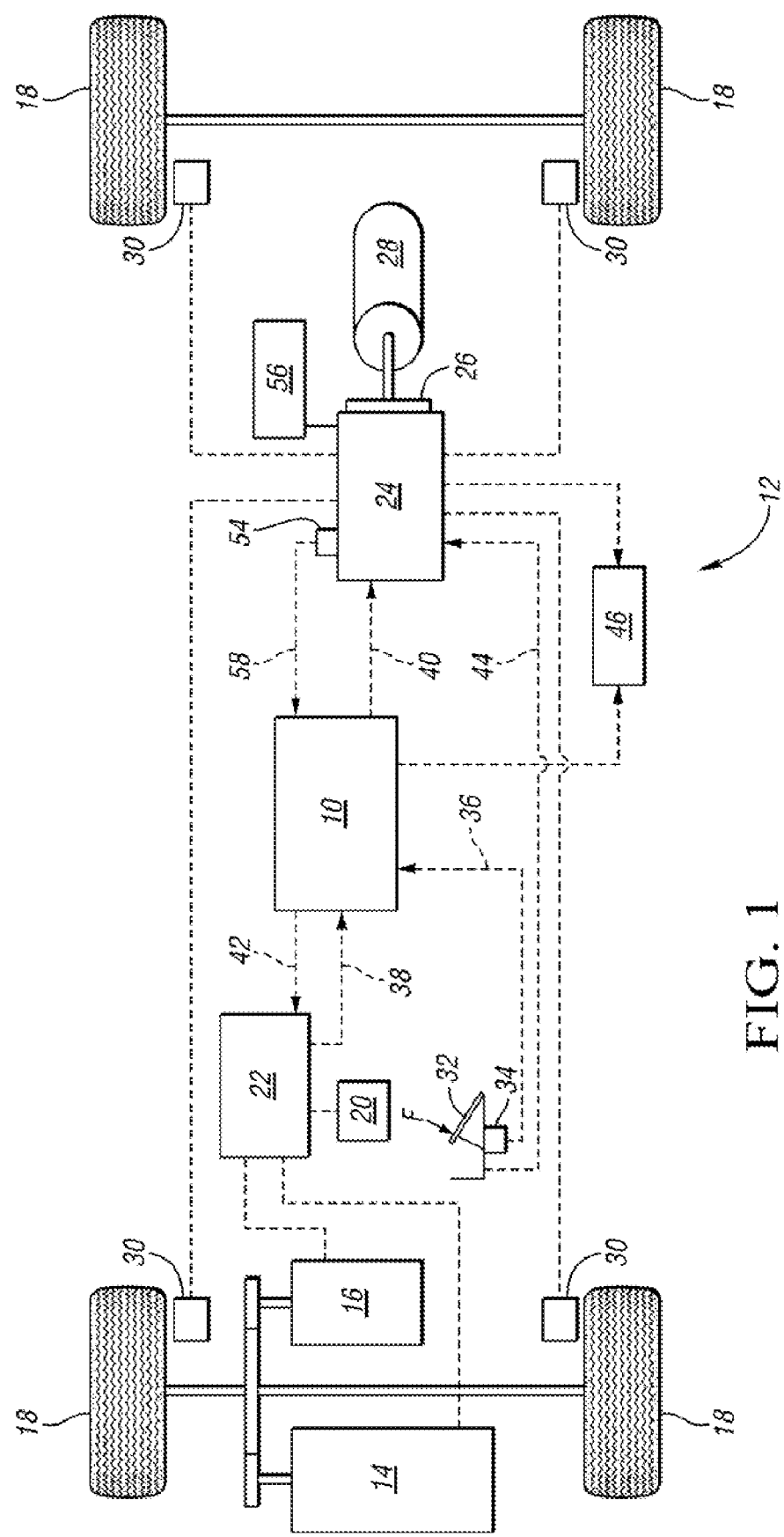
FIG. 1 is a schematic representation of a hybrid vehicle equipped with a brake simulator implementing a brake system fault pedal gain change method consistent with the present invention.

FIG. 1 is a schematic representation of a hybrid vehicle 12 equipped with a controller or brake simulator 10 implementing a brake system fault pedal gain change method consistent with the present invention. The hybrid vehicle 12 is mechanically propelled by either the engine 14 or the motor/generator 16. The electric drive control 22 regulates the operation of the motor/generator 16, controlling the operating mode of the motor generator 16. When the motor/generator 16 is operating to electrically propel the hybrid vehicle 12, the motor/generator 16 draws electrical power from the battery 20 through the electric drive control 22. Alternately the motor/generator 16 may operate as a generator to provide a regenerative brake torque to decelerate the hybrid vehicle 12 by converting a portion of the kinetic energy due to the rolling motion of the vehicle 12 into electrical energy which is stored to the battery 20 through the electric drive control 22. The hybrid vehicle 12 includes a brake simulator 10 and a hydraulic brake system 24. The brake system fault pedal gain change method of the present invention is not limited to use with a hydraulic brake system but is instead suitable for use with other brake systems including (for example) electric brake systems, and brake by wire systems. The brake system 24 includes a hydraulic pump 26 driven by a pump motor 28, an accumulator 56 to store pressurized hydraulic brake fluid, and a brake boost fault sensor 54. The brake system 24 is operatively connected to brake members such as (for example) brake corners 30 at each of the vehicle wheels 18 to selectively apply a braking torque to the vehicle 12 through friction braking applied at the brake corners 30. A driver operable brake pedal 32 includes at least one brake pedal sensor 34 configured to transmit a signal 36 to the brake simulator 10 which may include either or both of brake pedal force and brake pedal travel.

In normal vehicle operation, the brake pedal simulator 10 physically isolates the vehicle driver (not shown) from the vehicle friction brake system 24 and brake corners 30. This is necessary as braking torque is available from both regenerative braking through motor/generator 16 and also from friction braking at the brake corners 30. When the vehicle driver (not shown) depresses the brake pedal 32, the brake pedal sensor 34 communicates one or both of the brake pedal travel or brake pedal force as a signal 36 to the brake simulator 10. The brake pedal simulator 10 converts the signal 36 to a driver intended brake torque. The brake simulator 10 obtains a value of the available regenerative braking torque as a signal 38 from the electric drive control 22. In hybrid and electric vehicles it is typically preferred to utilize regenerative braking whenever possible and therefore the brake simulator 10 may partition the driver requested braking torque into a friction braking torque command 40 sent to the friction brake system 24 and a regenerative braking torque command 42 sent to the electric drive control 22.

In hybrid vehicle 12, modifications are made to the allocation between regenerative braking torque and friction braking torque by the brake simulator 10 as the hybrid vehicle 12 is slowed to a stop. These modifications in allocation must remain transparent to the vehicle driver (not shown). The brake corners 30 are hydraulically operated and the friction brake system 24 includes a pump motor 28 operatively connected to drive a hydraulic pump 26 to provide a source of pressurized hydraulic fluid to operate the brake corners 30. Pressurized hydraulic fluid from the hydraulic pump 26 is stored to an accumulator 56 which provides a ready reservoir of pressurized hydraulic fluid as a stored energy source to operate brake corners 30 and thereby decelerate the vehicle 12. It is possible for the hydraulic pump 26 and pump motor 28 to fault or fail to activate when required resulting in a brake boost system failure. The brake boost system failure is detected by brake boost fault sensor 54 and the fault signal is received by the brake simulator 10 through the brake boost fault signal link 58. If the hydraulic pump 26 or pump motor 28 fails, then the vehicle 12 may be driven and the friction brake system 24 operated normally until the accumulator 56 is depleted at which time the friction brake system 24 will default to an unboosted state. In the unboosted state, the brake pedal 32 may be operated to mechanically urge hydraulic fluid from the friction brake system 24 to the brake corners 30 through a mechanical or other link 44. As the brake system booster (hydraulic pump 26) is not operating, the required brake pedal force F to stop the vehicle 12 will increase, in some cases by as much as 10:1. The transition between a normal/boosted brake state and a non-boosted state can be abrupt and undesirable to the driver as a larger brake pedal force F is then required to reach a given vehicle deceleration.

There are multiple alerts or warnings that may occur to warn the driver that the hydraulic pump 26 or pump motor 28 has faulted, these include warning lights and fault warning messages displayed on a vehicle message center as shown schematically on FIG. 1 by driver alerts 46. Some of these alerts may be initiated by the brake simulator 10 through its knowledge of the occurrence of a brake boost failure as read from brake boost fault sensor 54. It is possible that driver alerts 46 may go unnoticed or ignored by the vehicle driver if the friction braking system 24 does not provide any other confirming indication that a fault has occurred. It is therefore desirable to give the vehicle driver some tactile feedback that a brake system fault has occurred through the brake pedal 32. In the event of a brake system fault such as a hydraulic pump 26 or pump motor 28 fault according to the present invention, the brake simulator 10 will add a multiplier or reduction calibration to the driver requested braking torque (determined from brake pedal sensor 34, as discussed above) which reduces the driver's requested braking torque by a calibrated percentage. The reduction calibration is selected to still allow the vehicle 12 to meet FMVSS-135 braking guidelines during the fault condition. The effect to the driver is that the driver will be required to provide a slightly higher pedal force F to achieve a given vehicle deceleration. This slightly higher pedal force F provides tactile feedback to the driver that the fault has occurred and confirms the driver alert 46 warning lights and messages, if provided. During continued operation of the vehicle 12 during a fault condition, the supply of pressurized hydraulic fluid in the friction brake system 24 will be eventually depleted and the vehicle 12 will default to an unboosted brake system state. The brake system fault pedal gain change method of the present invention advantageously provides an incremental increase in the required brake pedal force F prior to the unboosted brake system state being reached.

Figure 2:
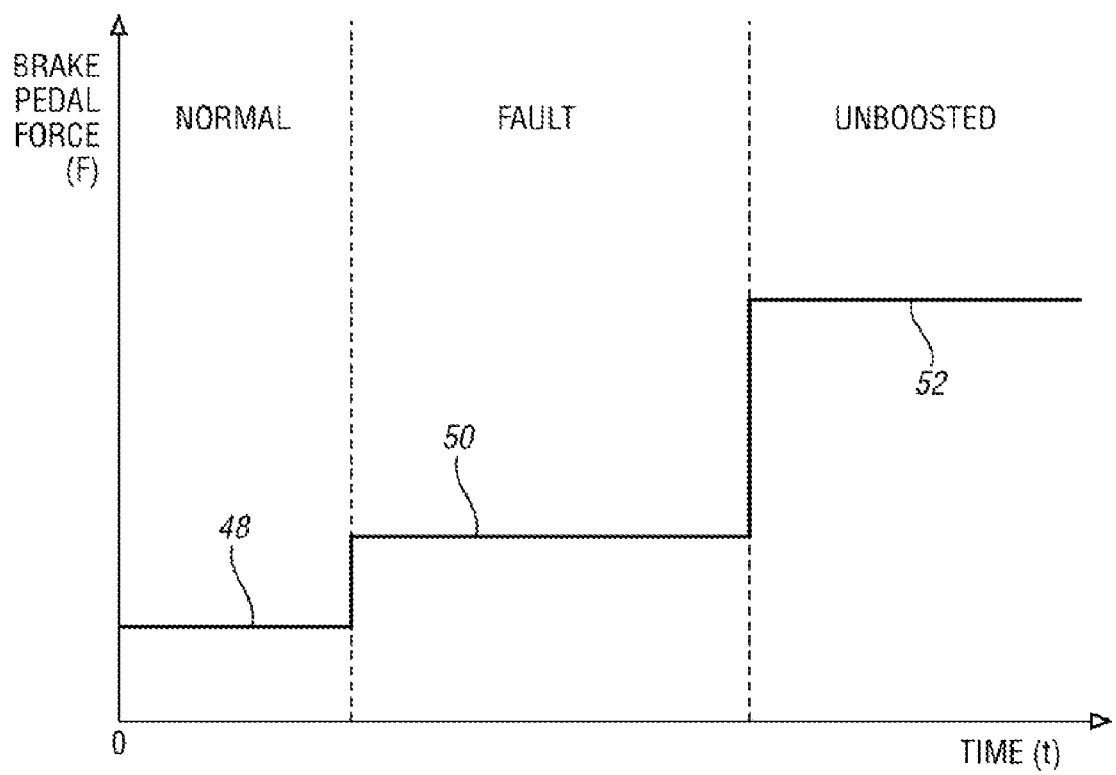
FIG. 2 is a qualitative graph of required brake pedal force to achieve a given vehicle braking torque during normal operation, brake system fault and later in an unboosted braking state consistent with the present invention.

Referring now to FIG. 2. FIG. 2 is a qualitative graph of required brake pedal force F to achieve a given vehicle braking torque during normal operation, brake system fault condition and later in an unboosted braking state. FIG. 2 illustrates that the brake system fault pedal gain change method of the present invention provides an early tactile feedback alert to the driver through increase brake pedal force F while in the brake system fault condition 50. Without the present invention, the required brake pedal force may rise abruptly from the normal pedal force 48 to the unboosted state 52 without the early warning alert and smaller incremental pedal force adjustment provided by the fault condition pedal force 50.

Figure 3:
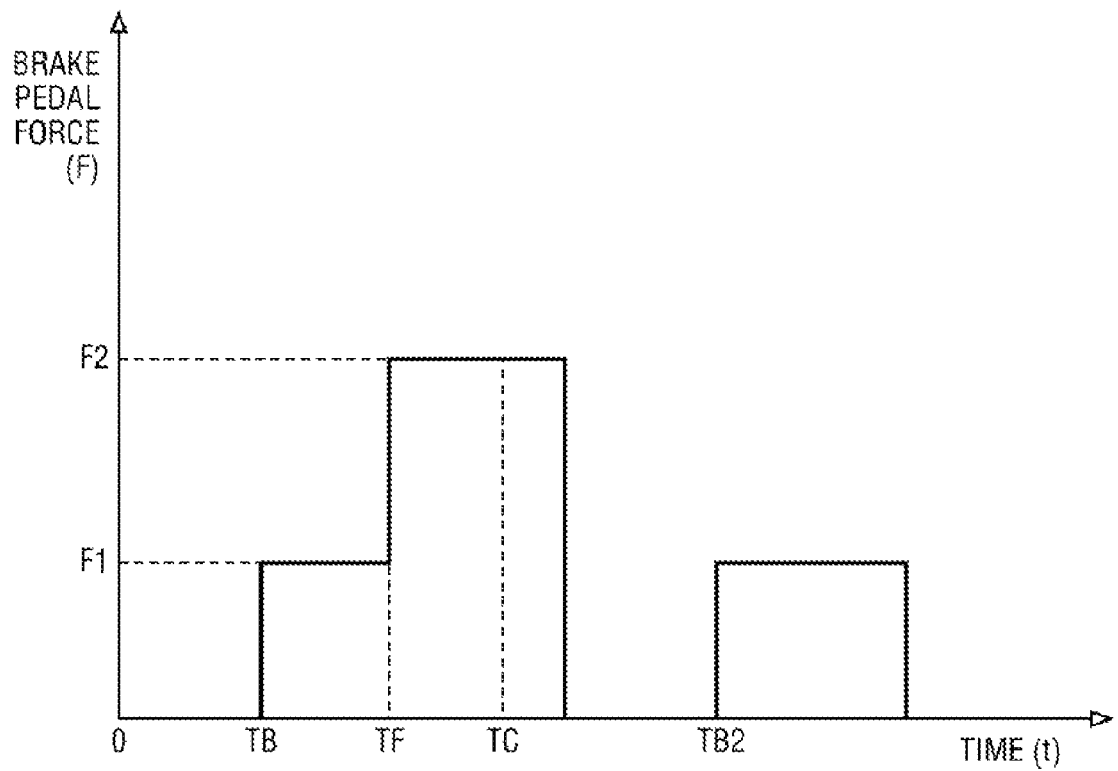
FIG. 3 is a qualitative graph of required brake pedal force F to achieve a given vehicle braking torque during normal operation followed by a brake system fault condition consistent with the present invention.

FIG. 3 is a qualitative graph of required brake pedal force F to achieve a given vehicle braking torque during normal operation followed by a brake system fault condition. The driver is required to apply a brake pedal force F1 at time=TB to achieve a desired vehicle braking torque. While braking, a brake system fault is detected at time=TF and the required brake pedal force F rises to F2. While continuing to brake, at time=TC the brake system fault clears; however, the required brake pedal force does not return to F1 until the brake pedal (32 FIG. 1) is released. During the subsequent braking application at time=TB2, the required brake pedal force F returns to F1 as the brake system fault previously cleared at time=TC and the brake system has returned to normal operation.

Figure 4:
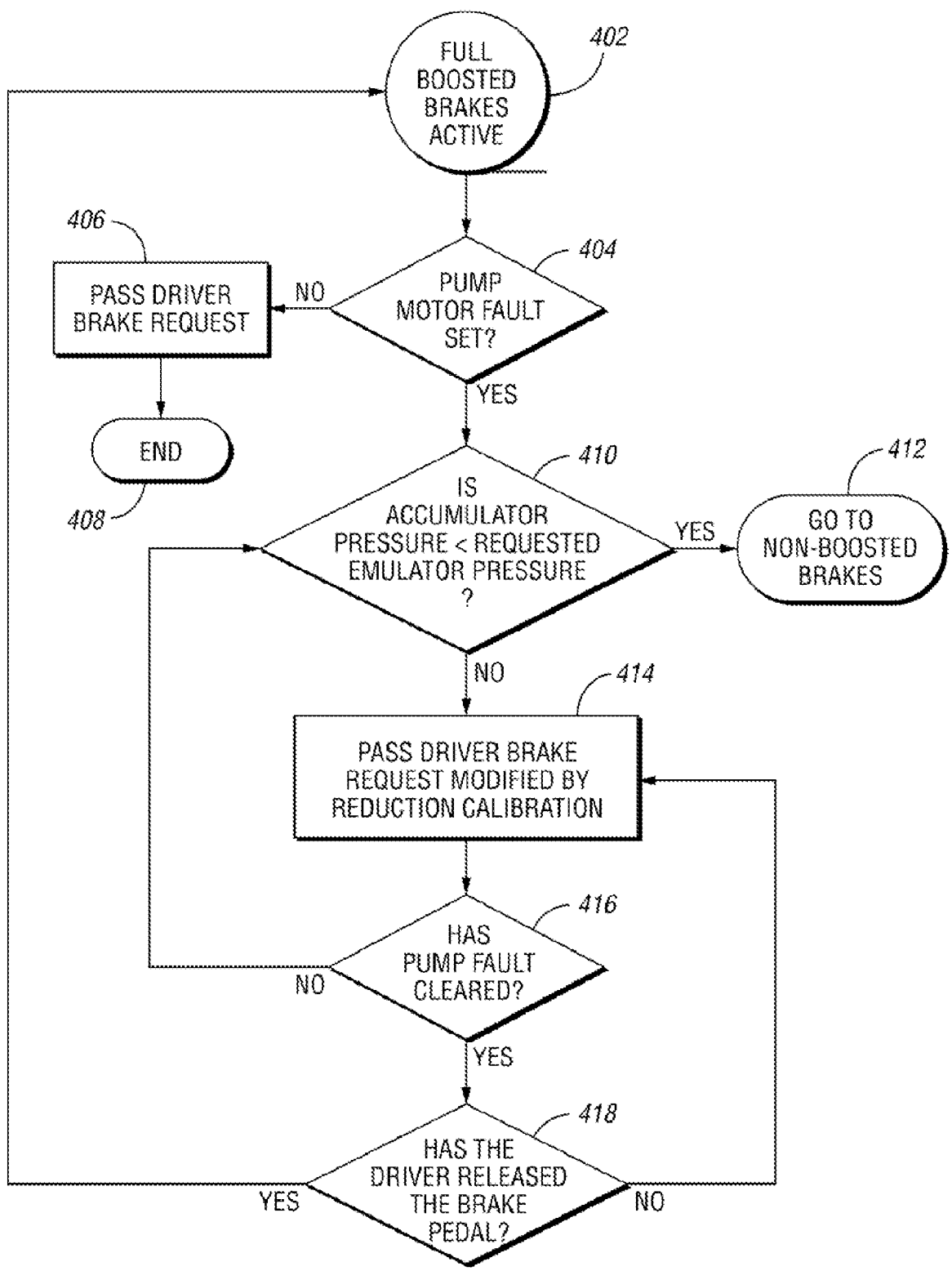
FIG. 4 is a flow chart of a brake system fault pedal gain change method for brake pedal simulator equipped hybrid or electric vehicles having a boosted hydraulic braking system consistent with the present invention.

FIG. 4 is a flow chart of a brake system fault pedal gain change method for brake pedal simulator equipped hybrid or electric vehicles consistent with the present invention. The method begins at 402 with the vehicle having full boosted brakes active. At block 404 a conditional test for a brake hydraulic pump motor fault condition. If the pump motor fault test is "no" for no fault detected, then control transfers to block 406 where the driver's intended braking torque (as derived from the brake pedal force and/or brake pedal travel as discussed earlier above) is utilized in the braking simulator without a reduction calibration and the method ends at 408. At block 404 if pump motor fault is a "yes" indicating a pump motor fault was detected, then control transfers to block 410 where a test is made to determine if the brake system hydraulic accumulator pressure is less than the hydraulic brake pressure required to meet the friction braking torque command (where driver's intended braking torque=regenerative braking torque+friction braking torque, the proportions determined by the brake simulator as discussed above). If the test in block 410 is "yes", indicating that the accumulator pressure is insufficient to meet the required hydraulic brake pressure from the brake simulator (or emulator), then control passes to block 412 with the brake system entering a non-boosted braking mode with the method ending at block 412. If test in block 410 is "no" indicating that the accumulator pressure is sufficient at block to meet the required hydraulic brake pressure from the brake simulator, then control transfers to block 414 where the driver's intended brake torque is reduced by a reduction calibration and the reduced intended braking torque is acted upon in the brake simulator to arrive at the friction braking torque command and the regenerative braking torque command as discussed with FIG. 1. The reduction calibration results in an increase in the required brake pedal force to achieve a given vehicle deceleration as discussed earlier, where the increased brake pedal force also serves to warn the driver of a compromised brake system prior to the loss of boosted brake operation. After block 414 control transfer to block 416 where a test is made to determine if the hydraulic pump fault has cleared. If the result of the test in block 416 is "yes" indicating that the hydraulic pump fault has cleared, then control passes to block 418. If the result of the test at block 416 is "no" indicating that the hydraulic pump fault has not cleared, then control branches back to block 410. At block 418 at test is made to determine if the driver has released the brake pedal. If the result of the test is "yes" indicating that the driver has released the brake pedal, then control transfers to block 402 with the vehicle having fully boosted brakes active. If the result of the test at block 418 is "no" indicating that the driver has not released the brake pedal, then control transfers to block 414 to continue to pass the driver's intended brake torque modified by the reduction calibration.

Figure 5:
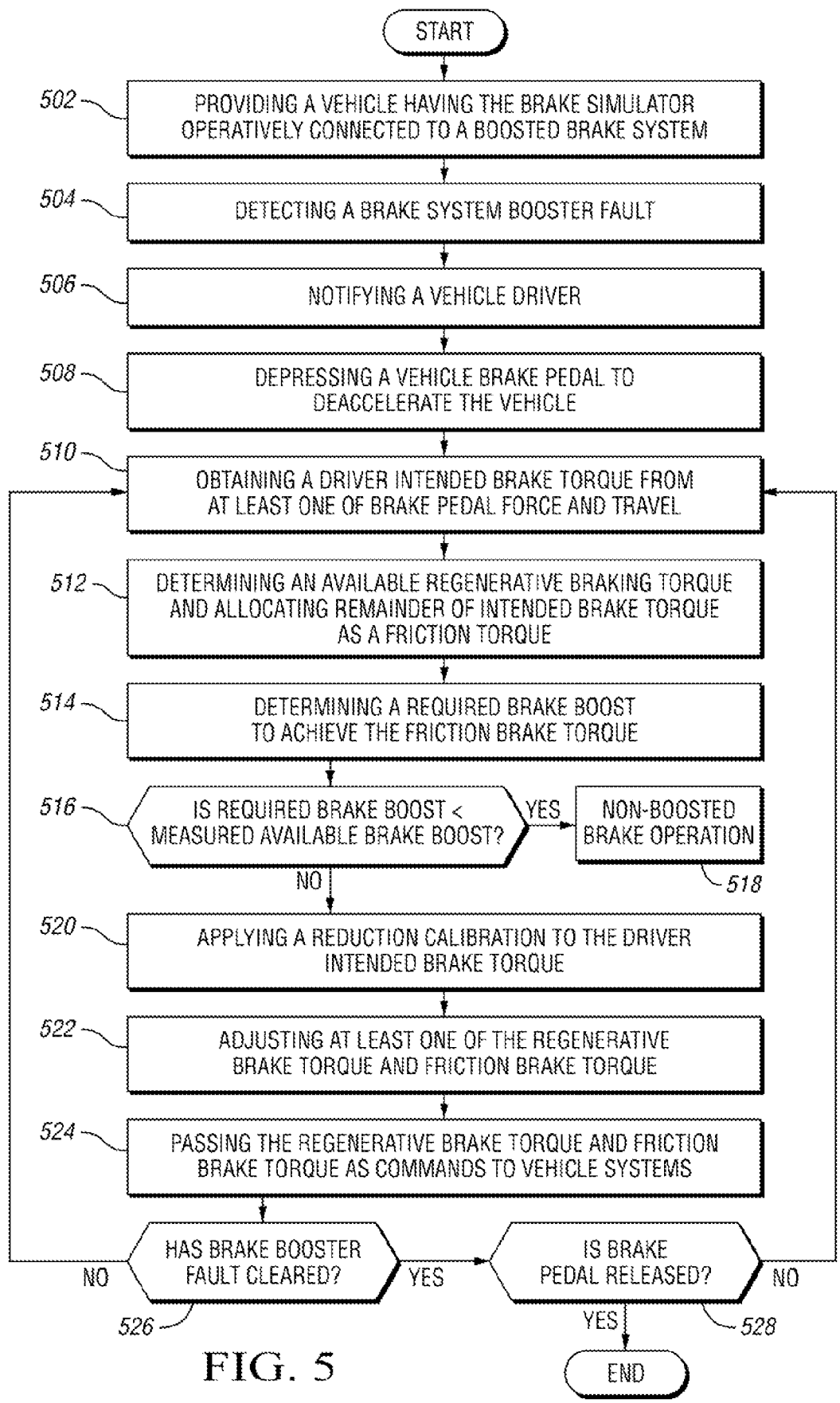
FIG. 5 is a flow chart of a brake system fault pedal gain change method for brake pedal simulator equipped hybrid or electric vehicles having any general type of boosted or power assisted braking system consistent with the present invention.

Referring now to FIG. 5, FIG. 5 is a flow chart of a brake system fault pedal gain change method for brake pedal simulator equipped hybrid or electric vehicles having any general type of boosted or power assisted braking system consistent with the present invention. The method begins at block 502 by providing a hybrid or electric vehicle having the brake simulator operatively connected to boosted brake system. At block 504 a brake system booster fault is detected. At block 506 an attempt is made to notify the vehicle driver of the fault, such as (for example) through a fault warning light on the vehicle instrument panel or a fault text message on a driver information display. At block 508 the driver depresses the brake pedal to decelerate the vehicle. At block 510 the driver's intended braking torque is determined from at least one of the brake pedal force or brake pedal travel. The available regenerative braking torque is then determined at block 512. The friction braking torque is then determined as the difference between the driver's intended braking torque and the available regenerative torque. At block 514 the required brake boost level to achieve the friction brake torque is determined. At block 516 if the available brake boost is less than the available brake boost, then control transfers to block 518 where the vehicle brake system enters non-boosted brake operation and the method ends. If the required base boost is not less than the measured available brake boost at block 516, then control transfers to block 520 where a reduction calibration is applied to the driver's intended brake torque thereby reducing the driver's intended brake torque. At block 522 at least one of the regenerative brake torque and the friction brake torque is adjusted according to the reduced driver's intended brake torque. At block 524 the regenerative brake torque and friction brake torque are passed to vehicle systems. At block 526 a test is made to determine if the brake booster fault has cleared. If the fault has not cleared, then control transfers to block 510, otherwise control transfers to block 528. At block 528 a test is made to determine if the brake pedal has been released. If the brake pedal was not released, then control transfers to block 510 otherwise the method ends.

While the best modes for carrying out the invention have been described in detail, those familiar with the art to which this invention relates will recognize various alternative designs and embodiments for practicing the invention within the scope of the appended claims.

The invention claimed is:

1. A method of implementing a brake pedal gain change in a vehicle having a brake simulator, a brake pedal operable by a driver of the vehicle for commanding actuation of a brake system, and a pedal sensor, the method comprising:
    detecting a fault in the brake system using a fault sensor;
    detecting at least one of a brake pedal force and a brake pedal travel of the brake pedal using the pedal sensor;
    converting the at least one of a brake pedal force and a brake pedal travel to a driver intended brake torque using the brake simulator;
    calculating the brake pedal gain change using the brake simulator; and
    applying the brake pedal gain change to automatically reduce the driver intended brake torque;
    wherein applying the brake pedal gain change increases a required amount of the brake pedal force needed to achieve a desired rate of vehicle deceleration, thereby providing tactile feedback to the driver of said fault in the brake system.

2. The method of claim 1, wherein applying the brake pedal gain change includes automatically increasing the required amount of brake pedal force over time.

3. The method of claim 1, wherein the method further comprises:
    sensing whether said fault has cleared; and
    discontinuing the applying of the brake pedal gain change when said brake system fault has cleared.

4. The method of claim 3, wherein discontinuing the applying of the brake pedal gain change occurs only after said brake pedal is released by the driver.

5. The method of claim 1, wherein the brake system includes a hydraulic pump driven by a motor, and wherein detecting a fault in the brake system includes detecting a fault in the pump or in the motor.

6. The method of claim 1, wherein the brake system includes an electric drive control configured to apply regenerative braking torque to slow the vehicle, the method further comprising:
    proportioning the reduced driver intended brake torque into a friction brake torque command and a regenerative brake torque command;
    communicating said friction brake torque command to a hydraulically-actuated portion of said brake system; and
    communicating said regenerative brake torque command to the electric drive control.

7. A braking system for an electrically driven vehicle, comprising:
    a friction brake system including:
        at least one braking member operable to apply a friction braking torque to wheels of the vehicle;
        a brake boost system providing energy to actuate said at least one braking member, said brake boost system having an energy storage member; and
        at least one brake system fault sensor operable to detect a brake boost system fault;
    an electric vehicle drive system including:
        at least one motor/generator operable to apply a regenerative braking torque to at least one of said wheels of said vehicle by conversion of mechanical energy into electrical energy; and
        an electric drive control electrically coupled to said at least one motor/generator and regulating operation of said at least one motor/generator;
    a brake simulator electrically interfaced with said friction brake system and said electric drive control, and in electrical communication with said brake system fault sensor;
    a brake pedal operable by a driver of the vehicle; and a brake pedal sensor operatively coupled to said brake pedal, and adapted for providing sensor measurements describing at least one of an amount of force and travel of the brake pedal to said brake simulator;

wherein said brake simulator determines an intended driver braking torque using said sensor measurements, and automatically applies a reduction calibration to reduce said intended driver braking torque when said brake boost system fault is detected.

8. The braking system according to claim 7, wherein said brake pedal is operably coupled to said friction brake system to cause manual activation of said braking members when said brake boost system fault results in said brake boost system having insufficient energy to actuate said braking members.

9. The braking system according to claim 7, wherein said brake simulator is in communication with said electric vehicle drive system to thereby receive a value of available braking torque from said electric vehicle drive system, and is operable for;

partitioning said intended driver braking torque into a regenerative braking torque and a friction braking torque;

sending the regenerative braking torque as a first command to said electric vehicle drive system; and sending said friction braking torque as a second command to said friction brake system.

10. The braking system according to claim 9, wherein the brake simulator is operable for continuing to apply said reduction calibration to said intended driver braking torque until said brake pedal is released after said brake boost system fault is detected and said brake boost system fault clears.

11. The braking system according to claim 7, wherein said at least one braking member is at least one brake corner operatively connected to apply friction braking to one or more wheels of said vehicle.

12. The braking system according to claim 7, wherein said friction braking system is a hydraulic brake system.

13. The braking system according to claim 7, wherein said brake boost system includes a hydraulic pump; and wherein said energy storage member is a hydraulic fluid accumulator charged by said hydraulic pump.

14. The braking system according to claim 7, wherein said friction brake system is an air brake system, said brake boost system includes an air compressor, and said energy storage member is an accumulator charged by said air compressor.

15. The braking system according to claim 7, wherein said friction brake system is electrically operated, and wherein said energy storage member is a battery powering actuation of said friction brake system.

16. An electronic brake system for a driver operated vehicle which has a pressure storage device providing a boosted state for decelerating the vehicle, and a pump and motor for generating said boosted state, wherein the pump is faultable for potentially causing the brake system to revert to an unboosted state, the system comprising:

a brake pedal responsive to a driver requested brake torque suitable for initiating the deceleration of said vehicle, wherein the driver requested brake torque is calculated and provided by the brake simulator; and a brake simulator connected to said brake pedal and responsive to a fault in one of the pump and the motor, and operable to reduce to the driver requested brake torque to effect a sufficiently higher tactile feedback to the driver through said brake pedal, whereby to alert said driver to a potential loss of boosted brake operation.

17. The method of claim 1, wherein calculating the brake pedal gain change using the brake simulator includes calculating a multiplier or a reduction calibration which reduces the driver requested braking torque by a calibrated percentage.

* * * * *